United States Patent
Ludwig et al.

[15] 3,658,638
[45] Apr. 25, 1972

[54] PLYWOOD PROCESS AND PRODUCT WHEREIN THE ADHESIVE COMPRISES A LIGNOSULFONATE-PHENOL-FORMALDEHYDE REACTION PRODUCT

[72] Inventors: Charles H. Ludwig; Albert W. Stout, both of Bellingham, Wash.

[73] Assignee: Georgia-Pacific Corporation, Portland, Oreg.

[22] Filed: Dec. 2, 1970

[21] Appl. No.: 94,592

Related U.S. Application Data

[62] Division of Ser. No. 846,217, July 30, 1969.

[52] U.S. Cl. ................................161/262, 156/335, 260/17.5
[51] Int. Cl. .........................................................B32b 27/42
[58] Field of Search ........................161/261, 262; 260/17.5; 156/335

[56] References Cited

UNITED STATES PATENTS

| | | | |
|---|---|---|---|
| 2,159,411 | 5/1939 | Wallace | 260/17.5 |
| 2,786,008 | 3/1957 | Hershler | 161/261 |
| 2,794,790 | 6/1957 | Marshall et al. | 260/17.5 |
| 3,227,667 | 1/1966 | Moffitt | 260/17.5 |

*Primary Examiner*—John T. Goolkasian
*Assistant Examiner*—D. J. Fritsch
*Attorney*—Peter P. Chevis

[57] ABSTRACT

An adhesive resin composition prepared by pre-reacting lignosulfonate with phenol under alkaline conditions and subsequently reacting the lignosulfonate-phenol product with formaldehyde under alkaline conditions.

11 Claims, No Drawings

PLYWOOD PROCESS AND PRODUCT WHEREIN THE ADHESIVE COMPRISES A LIGNOSULFONATE-PHENOL-FORMALDEHYDE REACTION PRODUCT

This application is a division of co-pending application, Ser. No. 846,217, filed July 30, 1969.

This invention pertains to a lignosulfonate-phenol-form-aldehyde resin. More particularly, it pertains to a phenol-formaldehyde adhesive containing lignosulfonate and a process for its preparation and use.

The use of lignosulfonate in conjunction with phenol-aldehyde resins is well-known. A large portion of the art pertains to the use of lignosulfonate in phenol-aldehyde resins for the preparation of resins, such as for molding and the like. Suggestions have also been made for the use of lignosulfonate in phenol-aldehyde adhesives. However, in most of these latter disclosures, the lignosulfonate is used as a filler or an extender and not as a reactant to partially replace one of the major adhesive constituents as phenol. Adhesives, for example for plywood preparation, must have certain working characteristics in addition to the proper adhesive properties for a satisfactory performance under modern production methods. Thus, even though good strengths may be possible under certain conditions with particular resins, the resins may not be suitable for adhesives, if the working characteristics are such that these results cannot be readily achieved under the accepted methods employed in the adhesive application. Heretofore, the use of lignosulfonate for other than as a filler has been greatly limited by the changes imparted by the lignosulfonate on the working characteristics as well as the adhesive properties.

It is, therefore, an object of this invention to provide a phenol-aldehyde resin containing lignosulfonate. A further object is to provide an adhesive wherein the lignosulfonate functions as a reactant in the adhesive replacing a portion of the phenol. A still further object is to provide an adhesive containing lignosulfonate which has basically the same working characteristics and adhesive properties as the phenol-formaldehyde adhesive without the lignosulfonate. A still further object is to provide a process for the preparation of an adhesive wherein a portion of the phenol is replaced with lignosulfonate without materially changing the working characteristics of the adhesive.

The above and other objects are attained, according to this invention, by pre-reacting an alkali metal lignosulfonate with a phenol under alkaline conditions and then reacting the pre-reacted lignosulfonate-phenol product with formaldehyde in the presence of an alkali metal hydroxide to condense the lignosulfonate-phenol product with formaldehyde to a particular degree such that the gel time at 100° C of a solution having about 40 weight percent solids concentration is in the range of from 23 to 32 minutes. By the above method, up to about half of the phenol may be substituted by the lignosulfonate without basically changing the working characteristics or adhesive properties of an adhesive prepared from the product. The adhesive may be applied and used under appreciably the same conditions and methods used for the adhesive where no phenol has been replaced by the lignosulfonate.

It is essential in the interaction of the lignosulfonate with the phenol that the lignosulfonate be in the form of an alkali metal salt, such as for example, sodium, potassium, or lithium lignosulfonate. The amount of lignosulfonate intermixed with phenol may vary widely from a small amount, such as 10 percent, up to about 100 percent of the weight of phenol. Since the lignosulfonate is less expensive, generally at least 20 percent of lignosulfonate is used, with the preferred amount being in the range of 25 to 50 weight percent of the phenol.

It is also essential that phenol be reacted with lignosulfonate under alkaline conditions, such as at a pH of 9 to 12, preferably 9.8 to 11, prior to reaction with the aldehyde. In effecting the reaction of the lignosulfonate with phenol under these conditions, the lignosulfonate is phenolated in a manner such that a relatively large amount of phenol radicals become associated or interacted with the lignin without increasing appreciably the molecular weight of the product. It is believed that under these conditions the phenolation is obtained with a minimum of polymerization or cross-linking of the lignosulfonates or of the reaction product leaving a sufficient number of reactive sites on the phenol radicals so that the product reacts with aldehyde in a manner similar to phenol. Generally, at least 7 weight percent, preferably at least 10 weight percent and above, of phenol, based upon the total solids content of the lignosulfonate product, is reacted or condensed with the lignosulfonate product. While the amount of phenol reacted or incorporated with the lignosulfonate product may be as high as 25 to 30 weight percent of the lignosulfonate product, generally, a large portion of the phenol added remains unreacted, since it may be distilled from the reaction product.

The reaction of the lignosulfonate product with phenol may be conveniently carried out with the amount of alkali desired for the initial phase of condensation with the aldehyde. This amount of alkali will generally give a pH in the preferred range. Although the reaction may be carried out by dissolving lignosulfonate and sodium hydroxide in melted phenol, the reaction is preferably carried out in a relatively concentrated aqueous medium. Solutions containing from 35 to 90 weight percent of the constituents are generally used, with solutions in the range of 65 to 85 percent being preferred. At the preferred concentrations, the reaction may be effected at temperatures, such as 90° to 125° C, without the need of pressure equipment. With the more dilute solutions, higher temperatures are generally employed, and a temperature of up to 180° C or somewhat higher may be used. It is convenient to employ a reaction time of from 1 to 4 hours which, however, may be widely varied, for example, from the time that is required to heat the reaction mixture to the higher reaction temperature to 24 hours or more, depending upon the concentration of the reaction mixture and the reaction temperature employed. Generally, for concentrated solutions in the preferred range, one to four hours is is sufficient at the lower temperatures with two to three hours being preferred. However, the more dilute solutions may have to be heated to 140° to 180° C to effect the reaction to the extent desired within this time. At the lower temperatures, 8 to 24 hours may be used for the more dilute solutions.

The lignosulfonate-phenol product may be reacted with formaldehyde under the methods generally used for the preparation of phenol-formaldehyde resins for adhesives under alkaline conditions except that the condensation reaction is not advanced as far, on the basis of gel time, as when the resin is prepared with phenol without the lignosulfonate. The amount of aldehyde used is in the range normally employed when phenol is used without the presence of lignosulfonate. Since, generally, the mole ratio of formaldehyde to phenol is in the range of 1.8:1 to 2.5:1, this ratio would be proportionately increased by the amount of lignosulfonate being used to replace the phenol, if the amount of aldehyde is based upon the actual phenol present in the mixture. On a weight basis, the same amount of aldehyde is added for the lignosulfonate as for phenol. The reaction is carried out in the presence of an alkali, usually sodium or potassium hydroxide. Generally, from 6 to 10 weight percent of the alkali, based upon the weight of the solution is used. This represents about 15 to 25 weight percent, based upon the solids in the condensation mixture, with 17 to 20 percent being preferred. Preferably, the alkali is added in several increments during the aldehyde condensation reaction. Upon the addition of the aldehyde, a sufficient amount of alkali is desired initially to catalyze the reaction. However, as the condensation progresses, the viscosity increases and further additions of the alkali decrease the viscosity. While the alkali may initially be added at one time, the presence of the excess of alkali with the unreacted aldehyde may result in some decomposition or reaction of the aldehyde with the alkali. By the addition of a part of the alkali after the aldehyde has been partially reacted, this side reaction may be avoided or minimized. The condensation is carried out to the extent that the gel time at 100° C for an aqueous solution of the reaction mixture having about 40 weight percent solids concentration is about 10 to 25 percent longer than for resins without the lignosulfonate. The reaction is preferably continued to a gel time of 26 to 28 minutes. The viscosity of the 40 percent resin solution at 25° C will vary with the amount of alkali used but generally will be in the range of 300 to 2,500 centipoises and under preferred conditions usually in the range of 500 to 1,000 centipoises. Many of the resins prepared have viscosities in the range of 700 to 1,000 centipoises.

The lignosulfonate or sulfonated lignin used in the reaction with the phenol may come from any source. Lignin is a polymeric substance of substituted aromatics found in plant tissue associated with cellulose and other constituents. While there is some variation in the chemical structure of lignin and of other constituents found in the plant, depending upon the type of plant, place where it was grown, and also upon the method used in the recovery or isolation of the particular constituents from the plant tissue, the basic structure and properties of the noncellulosic materials upon sulfonation are similar.

One of the main sources of lignosulfonates is residual pulping liquors obtained in the pulp and paper industry where lignocellulosic materials such as wood, straw, corn stalks, bagasse, and the like are processed to recover the cellulose or the pulp. In the sulfite or bisulfite pulping processes, the lignocellulosic material is digested with a sulfite or bisulfite solution to obtain a lignosulfonate product commonly referred to as "spent sulfite liquor" containing sulfonated lignin as its major constituent. These liquors may also contain carbohydrates, degradation products of carbohydrates, and resinous materials as well as other organic and inorganic compounds besides the sulfonated lignins. While all or part of these other materials may be removed, it is not necessary to do so. For example, the liquor may be fermented to remove the carbohydrates or fractionated by dialysis, solvent extraction, or other means to obtain not only a substantially purified lignosulfonate product, but a product in a particular molecular weight range.

Thus, the term "lignosulfonate" or "lignosulfonates" as used herein, as commonly used, includes purified sulfonated lignins as well as the unpurified sulfonated lignin products such as spent sulfite liquors.

The sulfonated lignins as obtained in the pulping liquors are salts of the base used in the pulping operation. Thus, in pulping operations employing calcium or magnesium as the metal base, the pulping liquor must be processed to convert the liquor to an alkali metal salt, generally to a sodium or potassium salt. The various known methods may be employed. Ion exchange or base exchange may be conveniently used. For example, a calcium base spent sulfite liquor may be treated with sodium sulfate converting the product to the sodium salt and precipitating the calcium as calcium sulfate.

In the preparation of the adhesive with the lignosulfonate-phenol-aldehyde resin product, the same methods and procedures as generally used for the preparation of phenol-formaldehyde adhesives without the lignosulfonate may be employed. The resin is normally added in amounts of from 40 to 65 weight percent of the adhesive solids with other constituents which are usually added to phenol-aldehyde adhesives making up the balance. For example, for wood lamination as in plywood manufacture, accelerators as alkali metal hydroxides and carbonates, alkali metal silicates, alkali metal borates, and alkali metal phosphates may be used. Also, fillers and extenders such as starch, wood flour, nutshell flour, bark products or agricultural residues, or other additives commonly used may likewise be added. In application, the adhesive is likewise used in the amounts and methods normally employed for the phenol-aldehyde adhesives.

The following example further illustrates the invention.

A plywood phenol-aldehyde adhesive was prepared from a lignosulfonate-phenol reacted product and compared to a phenol-formaldehyde plywood adhesive being commercially used containing no lignosulfonate.

A fermented calcium base liquor was used as a source for the lignosulfonate. The calcium base liquor was treated with sodium sulfate at about 80° C converting the product to the sodium salt and precipitating the calcium as calcium sulfate which was removed. The sodium lignosulfonate product, as an aqueous solution containing about 50 weight percent of total liquor solids, was intermixed with phenol and sodium hydroxide in the ratio of one part by weight of liquor solids to three parts phenol and 0.5 parts sodium hydroxide. The reaction mixture, as an aqueous solution containing about 73 percent solids, was refluxed at 108° C at atmoxpheric pressure for 1 hour. The reaction mixture was cooled to about 50° C and water added to dilute the mixture to a concentration of about 46 weight percent.

To the diluted reaction mixture of four parts of lignosulfonate and phenol, about 2.7 parts of formaldehyde were added as a 50 weight percent solution. The formaldehyde was stirred into the reaction mixture and maintained at a temperature in the range of 65° to 70° C for 1 ½ hours after which the addition of one part of sodium hydroxide was made in three increments to obtain about 18 percent sodium hydroxide in the final product on a dry basis. In the first increment, sodium hydroxide was added in an amount of one-fourth part as a 50 weight percent solution and the mixture heated for about 1 hour at 85° C after which a further addition of caustic was made in an amount of about one-fourth part. The product was then heated to 95° C and after one hour the final addition of caustic was made to obtain 18 percent of caustic in the product and continued heating at 95° C for 3 ½ hours. The gel time of the resin at 100° C was 25 minutes. It was determined by placing samples of the resin in 15 by 125 millimeter culture tubes in an amount sufficient to obtain about two inches of the resin in the tube. The tubes were then immersed in boiling water and the time that it took the resin to gel in minutes was noted. The gel point was determined by obtaining a gel of sufficient viscosity so that when the tube was inverted for 3 to 5 seconds, the air bubbles formed by the inversion traveled less than halfway through the gel within this time.

The resin was used in the formulation of a plywood adhesive for a mill test replacing a commercially used phenol-formaldehyde resin. The adhesive was prepared by intermixing with the resin wheat four and furfural alcohol process residue obtained from oat hulls as fillers and a further addition of sodium hydroxide and sodium carbonate in amounts shown on a solids basis in the table below. The final adhesive had a concentration of 40 percent solids.

| Product | Weight Percent |
|---|---|
| Furfural process residue | 24.0 |
| Wheat flour | 8.1 |
| Sodium Hydroxide (added) | 2.1 |
| Sodium carbonate (added) | 2.1 |
| Lignosulfonated-phenol-formaldehyde resin solids | 63.7 |

The adhesive thus prepared was used in the American Plywood Association "A" test used by the Association for approval of adhesives for single mill use. No changes were made in the operation of the equipment when the adhesive having a portion of the phenol in the resin substituted by lignosulfonate was used to replace the previously used commercial phenol-formaldehyde adhesive. Panels of 7/16 inch, 9/16 inch, and 13/16 inch were prepared. Glue spreads, pounds per double glue line, used were 66–72, 60–64, and 68–72, respectively. A maximum assembly time of 18 minutes was used. The assembled panels were subjected to hot pressing at 285° F with the press times increasing with thickness. The press times were 3 ½ minutes for the 7/16 inch panels, 4 ¾ minutes for the 9/16 inch panels, and 6 ¼ minutes for the 13/16 inch panels. The adhesive met the APA requirements for exterior grade use with wood failure averaging 90 percent for the 7/16 inch plywood, and 94 percent for the other two.

What is claimed is:

1. In a process of manufacturing plywood wherein an adhesive containing a phenol-formaldehyde resin is applied to the plys of wood to be laminated, the plys assembled to form a plywood panel, and the panel compresses at an elevated temperature to consolidate the panel and set the adhesive, the improvement which comprises applying an adhesive of a resin consisting essentially of a lignosulfonate-phenol product condensed with formaldehyde in the presence of from 15 to 25 weight percent, based upon the total condensation mixture solids, of an alkali metal hydroxide to the extent that an aqueous solution containing 40 weight percent solids concentration has a gel time at 100° C of from 23 to 32 minutes, said lignosulfonate-phenol product being the reaction product of phenol intermixed with from 10 to 100 weight percent, based upon the weight of phenol, of an alkali metal lignosulfonate in the presence of an alkali metal hydroxide and reacted at a pH in the range of 9 to 12 until the alkali metal lignosulfonate has reacted with at least 7 weight percent of phenol, based upon the lignosulfonate solids content.

2. A process according to claim 1 wherein the alkali metal lignosulfonate is a sodium lignosulfonate.

3. A process according to claim 2 wherein the sodium lignosulfonate is reacted with the phenol until at least 10 weight percent of phenol, based upon the lignosulfonate solids, has reacted with the lignosulfonate and the lignosulfonate-phenol product is reacted with formaldehyde in the presence of from 17 to 20 weight percent of sodium hydroxide until the gel time is in the range of from 26 to 28 minutes.

4. A process according to claim 3 wherein the sodium lignosulfonate is a sodium salt of spent sulfite liquor.

5. A process according to claim 2 wherein the sodium lignosulfonate and phenol are reacted in the presence of an alkali metal hydroxide for up to 24 hours at a temperature in the range of 90° to 180° C at a pH in the range of from 9 to 12 in an aqueous medium having solids concentration of from 35 to 90 weight percent.

6. A process according to claim 5 wherein the sodium lignosulfonate in an amount of from 25 to 50 weight percent, based upon the phenol, is intermixed with the phenol at a pH in the range of from 9.5 to 11 in an aqueous medium having a solids concentration in the range of from 65 to 85 weight percent and reacted at a temperature in the range of 90° to 125° C for from one to 4 hours.

7. A process according to claim 6 wherein the lignosulfonate-phenol product is reacted with formaldehyde in the presence of from 17 to 20 weight percent of sodium hydroxide until the gel time is in the range of 26 to 28 minutes.

8. A process according to claim 7 wherein the sodium lignosulfonate is a sodium salt of spent sulfite liquor.

9. A plywood panel obtained by the process of claim 1.

10. A plywood panel obtained by the process of claim 3.

11. A plywood panel obtained by the process of claim 7.

* * * * *